United States Patent
Ruetschi et al.

(10) Patent No.: US 8,009,593 B2
(45) Date of Patent: Aug. 30, 2011

(54) TELECOMMUNICATIONS SYSTEM, METHOD OF MANAGING A TELECOMMUNICATIONS SYSTEM FOR OPTIMIZED BANDWIDTH USAGE DURING CONFERENCE CALLS AND PROGRAM PRODUCT THEREFOR

(75) Inventors: Johannes Ruetschi, Boca Raton, FL (US); Rodrigo Pastro, Lake Worth, FL (US); Mallikarjuna Samayamantry Rao, Delray Beach, FL (US); Geert Fieremans, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 827 days.

(21) Appl. No.: 12/079,125

(22) Filed: Mar. 25, 2008

(65) Prior Publication Data

US 2009/0245497 A1 Oct. 1, 2009

(51) Int. Cl.
*H04L 12/16* (2006.01)

(52) U.S. Cl. ........................ 370/260; 709/204

(58) Field of Classification Search ............. 379/202.01; 370/260; 709/204
See application file for complete search history.

(56) References Cited

U.S. PATENT DOCUMENTS

| | | | | |
|---|---|---|---|---|
| 6,404,873 | B1* | 6/2002 | Beyda et al. | 379/202.01 |
| 6,577,638 | B1* | 6/2003 | Tashiro et al. | 370/401 |
| 6,598,075 | B1* | 7/2003 | Ogdon et al. | 709/204 |
| 7,215,643 | B2* | 5/2007 | Mussman et al. | 370/237 |
| 7,697,433 | B2* | 4/2010 | Dahm et al. | 370/235 |
| 2002/0085490 | A1* | 7/2002 | O'Neil | 370/229 |
| 2004/0116130 | A1* | 6/2004 | Seligmann | 455/456.1 |
| 2008/0063173 | A1* | 3/2008 | Sarkar et al. | 379/202.01 |

* cited by examiner

*Primary Examiner* — Creighton Smith

(57) ABSTRACT

A telecommunications system, method of managing a telecommunications system and program product therefore. Telecommunications system branches are linked to a network and to each other in a wide area network (WAN). Each branch includes telecommunications devices and a media processor that supports a concurrent port for each local telecommunications device. A controller, e.g., at a data center, selects media processing resources to aggregate system media during conference calls for efficient bandwidth use. The controller may select resources based on user location, Call Admission Control (CAC) policy bandwidth usage, and availability of media resources and media processor ports.

17 Claims, 5 Drawing Sheets

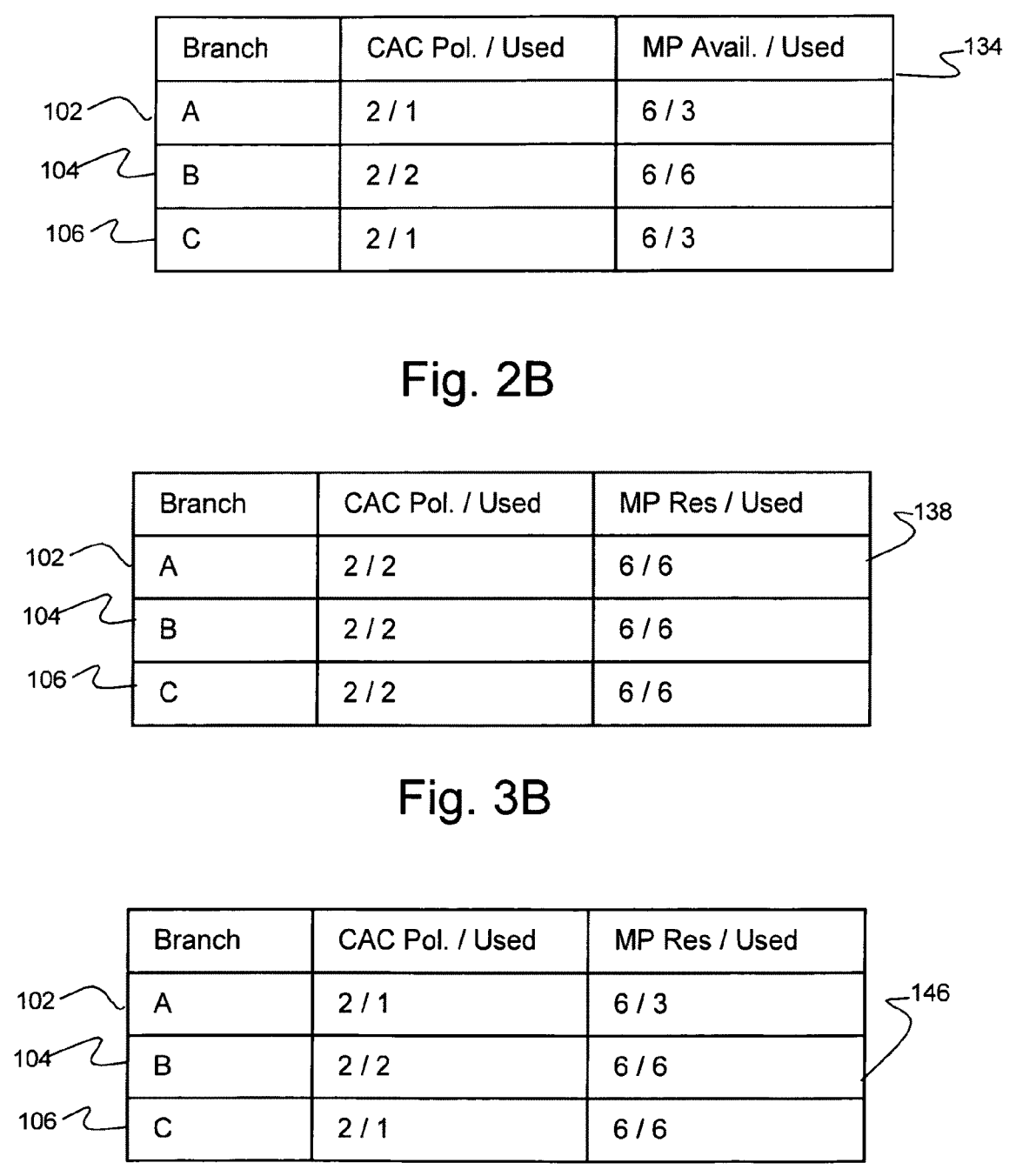

| Branch | CAC Pol. / Used | MP Avail. / Used |
|---|---|---|
| A | 2 / 1 | 6 / 3 |
| B | 2 / 2 | 6 / 6 |
| C | 2 / 1 | 6 / 3 |

Fig. 2B

| Branch | CAC Pol. / Used | MP Res / Used |
|---|---|---|
| A | 2 / 2 | 6 / 6 |
| B | 2 / 2 | 6 / 6 |
| C | 2 / 2 | 6 / 6 |

Fig. 3B

| Branch | CAC Pol. / Used | MP Res / Used |
|---|---|---|
| A | 2 / 1 | 6 / 3 |
| B | 2 / 2 | 6 / 6 |
| C | 2 / 1 | 6 / 6 |

Fig. 4B

TELECOMMUNICATIONS SYSTEM, METHOD OF MANAGING A TELECOMMUNICATIONS SYSTEM FOR OPTIMIZED BANDWIDTH USAGE DURING CONFERENCE CALLS AND PROGRAM PRODUCT THEREFOR

BACKGROUND OF THE INVENTION

1. Field of the Invention

The present invention is related to packet based telecommunications such as Voice over Internet Protocol (VoIP) communications and more particularly, to controlling packet based telecommunications networks for multiparty calls such as VoIP conference calls.

2. Background Description

Since Voice over Internet Protocol (VoIP) communications use a connectionless protocol, as long as Quality of Service (QoS) is not a factor, any number of calls may be carried over a packet based network link. However, because bandwidth is not unlimited, QoS is almost always a consideration. Limited bandwidth has required constraining link traffic to insure high QoS. In particular, in a connectionless protocol telecommunications system conducting too many calls over a broadband link can cause gaps, delays and dropped calls. Consequently, packet networks restrict the number of active calls to protect voice traffic from the negative effects of other voice traffic and to prevent excess voice traffic.

Currently, for example, Call Admission Control (CAC) is used in packet based telecommunications, such as VoIP, to control and ensure adequate bandwidth for the authorized communications flows. Typically, CAC policies are implemented to ensure that calls cannot setup whenever current traffic is consuming enough of the available broadband or wide area network (WAN) bandwidth to make it impossible to support added flow without negatively affecting the QoS for existing voice traffic.

Typically, these CAC policies treat all calls the same. Conference calls that may originate from multiple network endpoints, traverse the Internet, for example, connecting to another, remote network branch with multiple participating network endpoints. Assigning each participant as an individual call is inefficient and may, very likely and very quickly, consume most or all available resources. One party, e.g., initiating the conference, cannot select the media processor for the conference call with other participants remote to the originator. Further, typical state of the art call management servers that provide conference services to a large number of locations are constrained by CAC policies for any location remote to the single selected media processor. This frequently results in otherwise available WAN link bandwidth, e.g., in branches other than the branch where the selected media processor resides, being unused and unusable.

Thus, there is a need for packet telecommunications networks that improve bandwidth usage on WAN links for optimal network capacity consumption to expand the number of allowable conference calls and call participants for a given WAN link bandwidth.

SUMMARY OF THE INVENTION

It is a purpose of the invention to optimize bandwidth usage during conference calls in telecommunications systems;
It is another purpose of the invention to increase conference call capacity in telecommunications systems;

It is yet another purpose of the invention to improve real time media usage management for telecommunications networks with bandwidth that is limited between branch offices.

The present invention relates to a telecommunications system, method of managing a telecommunications system for optimized bandwidth usage during conference calls and program product therefor. Telecommunications system branches are linked to a network, e.g., the Internet, and to each other in a wide area network (WAN). Each branch includes telecommunications devices and a media processor that supports a concurrent port for each local telecommunications device. A controller, e.g., at a data center, selects media processing resources to aggregate system media during conference calls for efficient bandwidth use. The controller may select resources based on user location, Call Admission Control (CAC) policy bandwidth usage, and availability of media resources and media processor ports.

BRIEF DESCRIPTION OF THE DRAWINGS

The foregoing and other objects, aspects and advantages will be better understood from the following detailed description of a preferred embodiment of the invention with reference to the drawings, in which:

FIGS. 2A-B show a simple example of a first conference setup and assignment table for a conference involving 2 parties from branch A, 4 parties from branch B, and 2 parties from branch C;

FIGS. 3A-B show an example of a second conference setup and assignment table for a second conference on the same system;

FIGS. 4A-B show yet another example, wherein a second conference is established between branches B and C, even though Branch B is fully booked.

DESCRIPTION OF PREFERRED EMBODIMENTS

Figure 1:
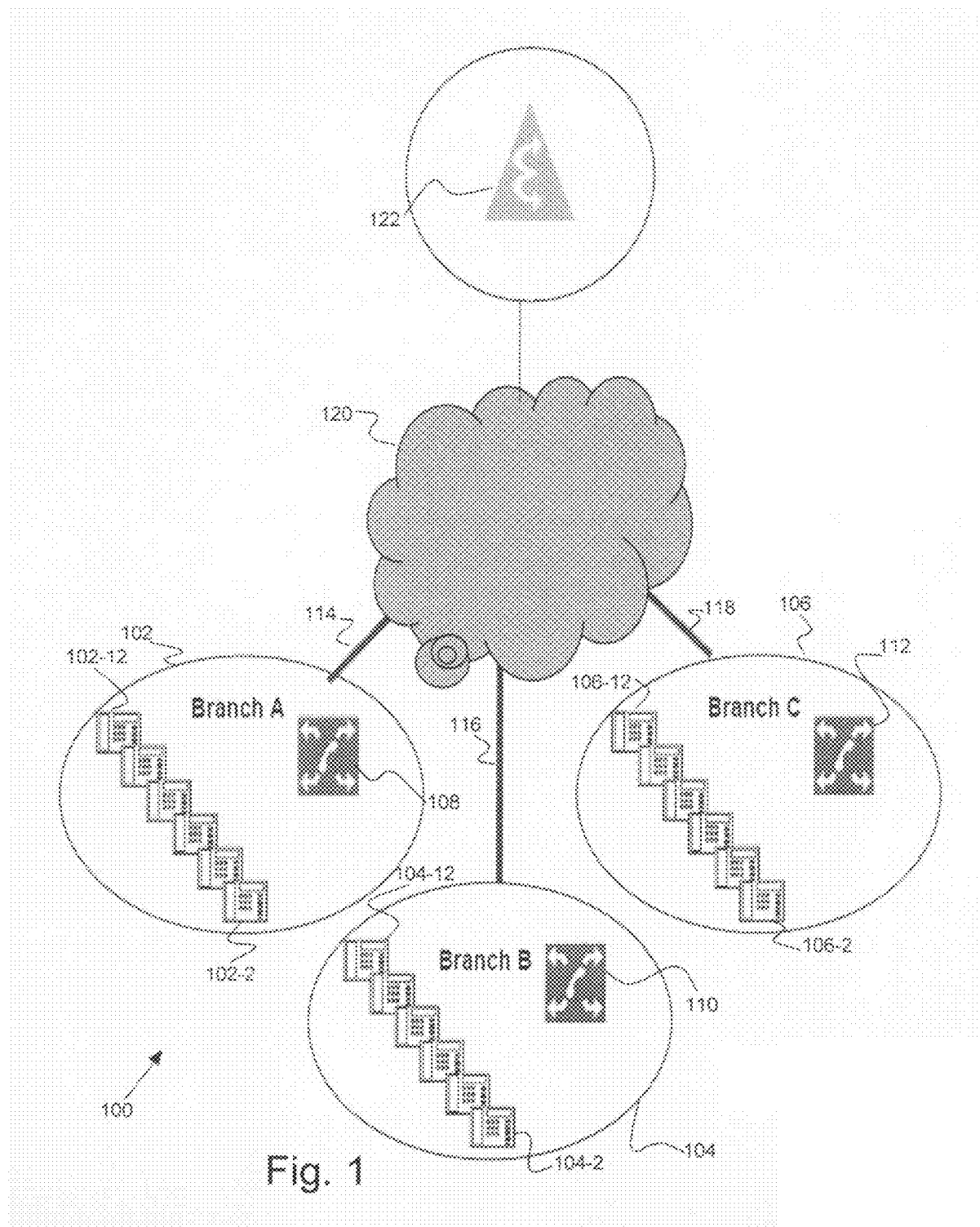
FIG. 1 shows an example of an enterprise with a star shaped network according to a preferred embodiment of the present invention.

Turning now to the drawings and more particularly, FIG. 1 shows an example of an enterprise with a star shaped network 100 according to a preferred embodiment of the present invention. The star shaped network 100 in this example includes 3 branches 102, 104, 106, also labeled A, B and C. Each branch 102, 104, 106 has multiple (6 in this example) endpoints 102-2—102-12, 104-2—104-12, 106-2—106-12, and a media processor 108, 110, 112. Each media processor 108, 110, 112 supports 6 concurrent ports. Each branch 102, 104, 106 has a bandwidth limited WAN link 114, 116, 118 to a network 120, e.g., the Internet or any suitable network, with a CAC policy that allows two media streams. A controller 122, e.g., located in a data center, selects media processing resources for the entire network 100 to aggregate media for efficient bandwidth usage on WAN links 114, 116, 118, according to a preferred embodiment of the present invention. It should be noted that the star topology of the network 100 in this example is for example only and not intended as a limitation. The present invention has application to any suitable network topology, including tree and mesh topologies or any combination thereof.

In particular, upon initiating a conference call, e.g., receiving a request for a conference call, a preferred controller 122 proceeds with media processing resource selection for the enterprise 100, selecting resources for conference media processors 108, 110, 112 based on user location, CAC policy bandwidth usage, and availability of media resources and media processor ports. Each CAC policy sets the number of concurrent media streams that are allowed over the WAN links 114, 116, 118, depending upon link bandwidth. Ports on media processors 108, 110, 112 may be reallocated as parties are added or removed from conference calls, e.g., using standard media gateway control protocols. Typical such standard gateway control protocols include, for example, Media Gateway Control Protocol (MGCP), media gateway control (megaco) and Session Initiation Protocol (SIP) with Minimal XML/Media Objects Markup Language (MXML/MOML). Further, the controller 122 provides media re-negotiation towards the conference parties using, for example, SIP/Session Description Protocol (SIP/SDP). Thus, even when conference activity on one branch (e.g., 104) uses all available Call Admission Control (CAC) resources and occupies all available bandwidth for that branch 104, the controller 122 can establish other independent conference calls, e.g., between other of branches 102, 106.

Figure 2A:
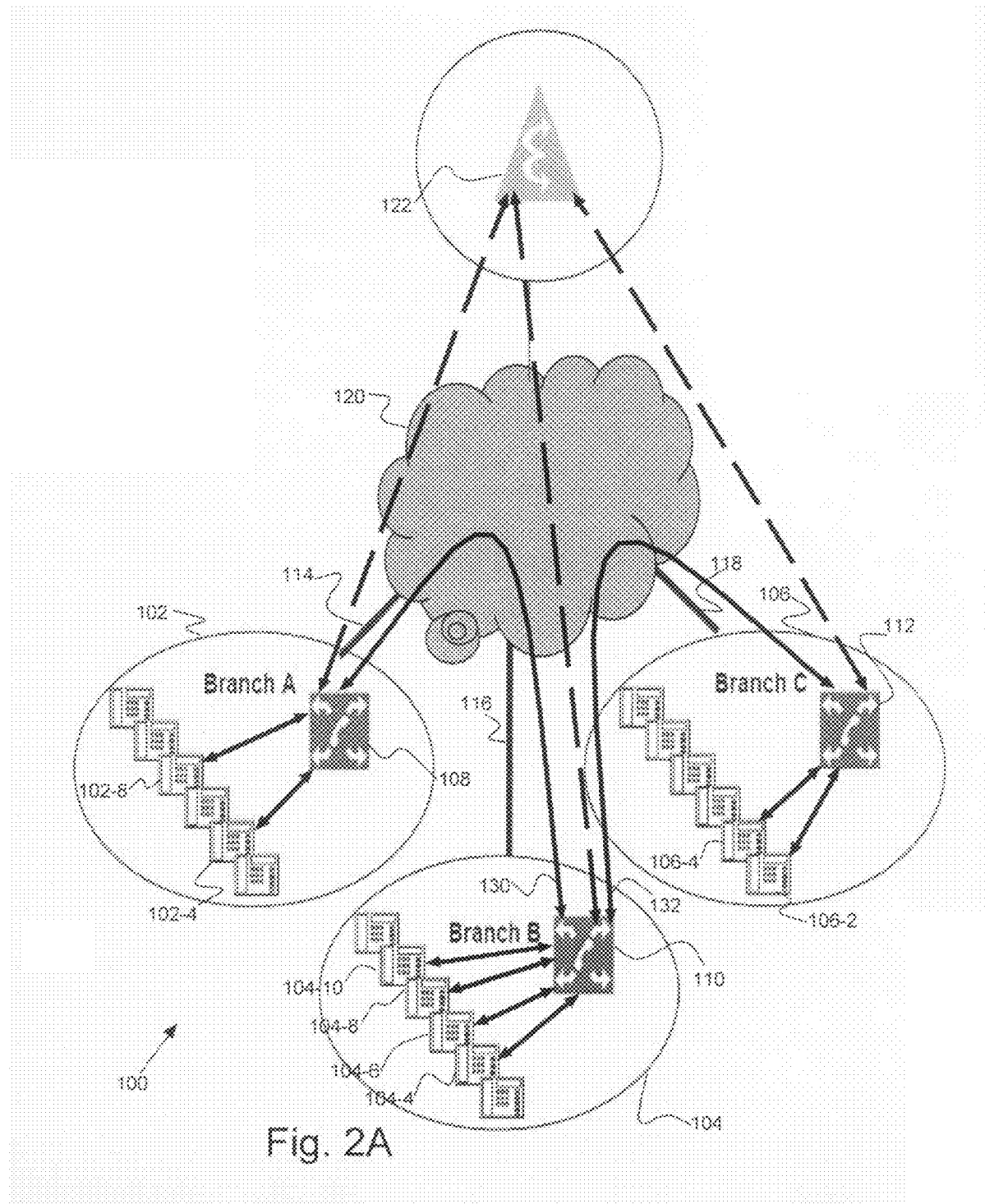

FIGS. 2A-B show a simple example of a first conference setup by the controller 122 and a corresponding assignment table with like features labeled identically. In this example, the conference involves 2 parties 102-4 and 102-8 from branch A, 4 parties 104-4, 104-6, 104-8, and 104-10 from branch B, and 2 parties 106-2 and 106-4 from branch C. The controller 122 allocates resources for the media processors or servers 108, 110, 112 to minimize media streams 130, 132 based on user location, CAC policies, and availability of media processor ports as indicated hereinabove.

In particular, the CAC policies define resource thresholds for each link. This resource threshold may be expressed in terms of bandwidth or simply, as a number of concurrent calls. In this simple example, the controller 122, treats each media stream 130, 132 as consuming the same bandwidth. Usage also may be described within the same unit. Although in Branch 102, for example, the CAC policy permits 2 media streams or call legs across the WAN, the usage in FIG. 2A is 1 call leg, media streams 130. Preferably, however, the controller 122 is aware of the media negotiations for each call, and uses a more sophisticated calculation based on consumed bandwidth; the sum of the bandwidth that the media streams 130, 132 actually consume in branch 104, for example.

Assignment table 134 of FIG. 2B shows the assignment of concurrent calls per CAC policy and Media Processing (MP) resources, comparing available with used for this example. In the first branch 102 at the WAN link 114 one of two available concurrent calls for the CAC Policy is used for three of the six media processor 108 ports (to 102-4, 102-8 and media processor 110). In the second branch 104 at WAN link 116 both of the available concurrent calls for the CAC Policy are used for all six of the six media processor 110 ports (to 104-4, 104-6, 104-8, 104-10 and media processors 108, 112). Likewise, in the third branch 106 at WAN link 118 one of two available concurrent calls for the CAC Policy is used for three of the six media processor 112 ports (to 106-2, 106-4 and media processor 110). So as can be seen from this simple example, WAN resource usage is assigned to optimize media processing resources distributed within each CAC policy, leaving resources available at branches 102 and 106 for other calls or conference calls, for example.

Figure 3A:
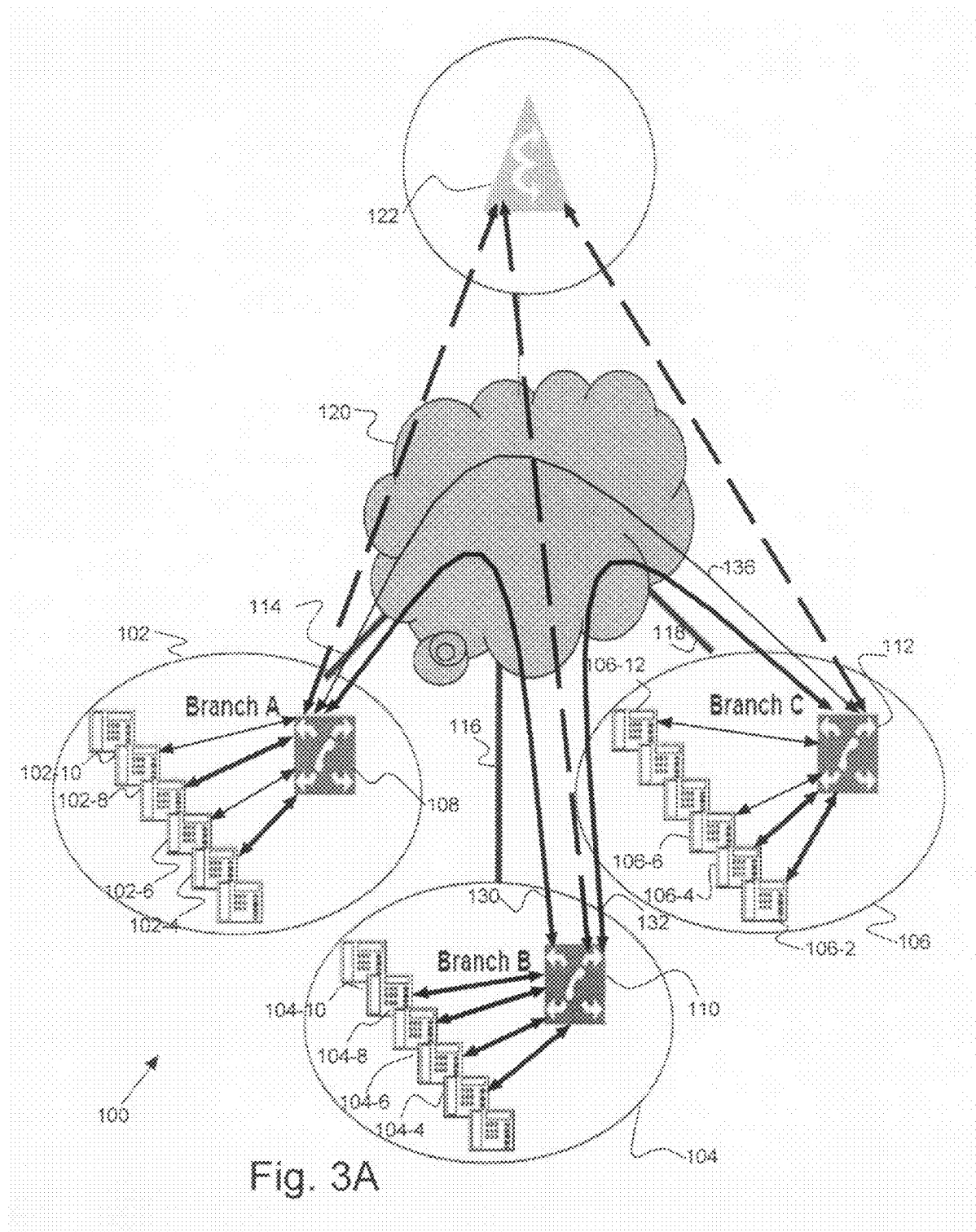

FIGS. 3A-B show an example of a second conference setup by the controller 122 in response to a subsequent request and a corresponding assignment table for the second conference on the same system 100 with like features labeled identically. This second conference involves 2 different parties 102-6 and 102-10 from branch A and 2 different parties 106-6 and 106-12 from branch C. The controller 122 allocates remaining resources for media servers 108 and 112 to media stream 136, again treating each media stream 130, 132 and 136 as consuming the same bandwidth. This establishes the second conference. The updated assignment table 138 reflects all CAC policies and MP resources being used.

Figure 4A:
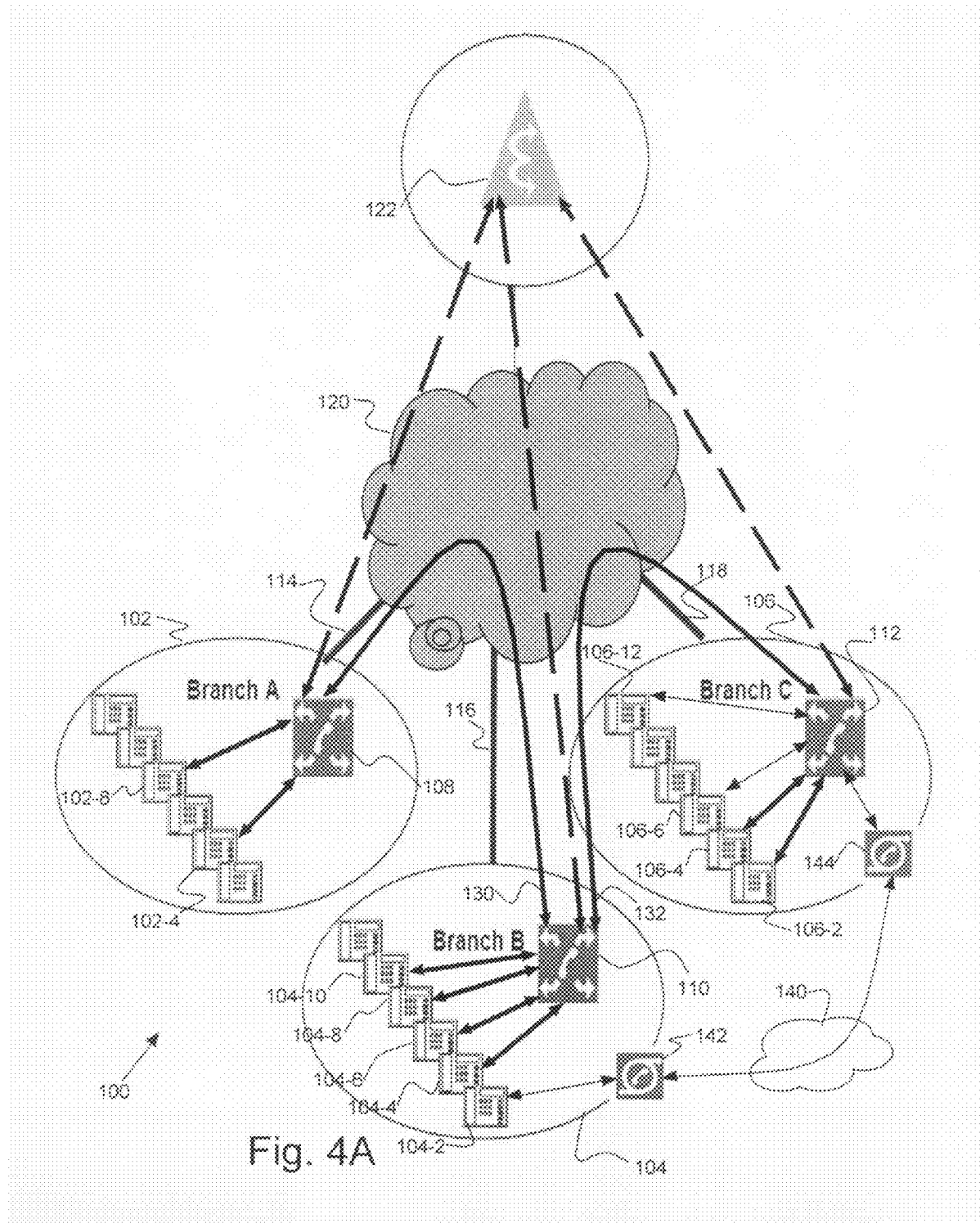

FIGS. 4A-B show yet another example, wherein a second conference is established between branches B and C by the controller 122 in response to a subsequent request and with like features labeled identically. In this example, the second conference is established even though Branch B is fully booked, i.e., all CAC policies and MP resources are in use. The second conference has 1 party from Branch B, and 2 parties from Branch C. In this example, each of branches B and C is connected to an external network 140, e.g., a publicly switched telephone network (PSTN), through a local gateway 142, 144. Preferably, although not shown in this example, each branch has a local gateway to an external network or some other path to connecting to other branches. Continuing this example, branch B endpoint 104-2 is directly connected to the local gateway 142. Branch C endpoints 106-6 and 106-12 connect through the media processor 112 to the local gateway 144. The corresponding assignment table 146 reflects that CAC policies and MP resources are assigned for branches A and B as in the single conference call example of FIGS. 2A-B. However, the assignment table 146 reflects that Branch C has only one CAC policy in use, but all MP resources are being used.

Advantageously, the present invention distributes media processing resources for conferencing in telecommunications networks otherwise constrained by limited bandwidth links. Resources are distributed based on user location, link bandwidth and CAC policies. In particular, the present invention optimizes resources in systems serving any geographically distributed organization that may rely on real time conferencing to conduct business. Conference media processor resources are deployed based on CAC policies; Conference media processor resources are selected for the network based on: user location, bandwidth usage per CAC policy, available/free media resources per media processor.

A preferred call management server controls conference calling to provide optimized conference services to a large number of locations that could not be controlled by a single media processor. Conference participants may be added in excess of defined CAC policies, aggregating media (e.g., local media processing) for more efficient WAN link bandwidth usage. Conference media processors and processor resources may be selected based on the party initiating the conference, even with other participants in locations remote to the conference originator.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:
1. A telecommunications system comprising:
a plurality of branches, each linked to a network, said plurality of branches being networked with each other;
a plurality of telecommunications devices at each of said plurality of branches;
a media processor at each of said plurality of branches, said media processor supporting a concurrent port for each one of a corresponding said plurality of telecommunications devices; and a controller selecting media processing resources to aggregate system media during conference calls for efficient bandwidth use.

2. A telecommunications system as in claim 1, wherein said controller provides media processing resource selection responsive to Call Admission Control (CAC) policies defined for each branch.

3. A telecommunications system as in claim 1, wherein said controller is located in a data center and selects conference media processing resources based on user location, Call Admission Control (CAC) policy bandwidth usage, and availability of media resources and media processor ports.

4. A telecommunications system as in claim 3, wherein said controller is aware of media negotiations for each conference call and further selects conference media processors responsive to bandwidth consumed by each media stream.

5. A telecommunications system as in claim 1, wherein when conference activity on one branch occupies all available Call Admission Control (CAC) policy bandwidth for that branch, said controller establishes other conference calls between other ones of said plurality of branches.

6. A telecommunications system as in claim 1, wherein said controller further provides media re-negotiation towards conference parties.

7. A telecommunications system as in claim 1, wherein said network is a wide area network (WAN), said WAN further comprising a local gateway in at least two of said plurality of branches, each linked to an external network, and wherein when conference activity on one branch of said at least two occupies all available Call Admission Control (CAC) policy bandwidth for that branch, said controller establishes other conference calls between said one branch and other ones of said at least two through said external network.

8. A telecommunications system as in claim 7, wherein said plurality of branches are linked together over the Internet and said external network is a publicly switched telephone network (PSTN).

9. A telecommunications system as in claim 8, wherein telecommunications devices on said one branch conferenced with telecommunications devices on other branches are connected to the PSTN through a respective said local gateway and said other branches are ported to said PSTN through a port on a respective said media processor.

10. A method of managing communications in a telecommunications network, said method comprising the steps of:
 a) receiving a request for a conference call amongst endpoints at a plurality of branches in said telecommunications network;
 b) selecting conference media processor resources in branches involved in the requested conference call based on user location, branch bandwidth usage, and availability of media resources and media processor ports, wherein said conference media processor resources are selected to optimize bandwidth usage in said telecommunications network;
 c) monitoring said telecommunications network for additional conference calls; and responsive to receipt of a request,
 d) returning to step (b) and, selecting said conference media processor resources in branches involved in the requested conference call from remaining said conference media processor resources.

11. A method of managing communications in a telecommunications network as in claim 10, wherein whenever in step (b) remaining said conference media processor resources are insufficient in one involved branch, step (b) further comprises routing a respective media stream through an external network between said one and other said branches in the requested conference call.

12. A method of managing communications in a telecommunications network as in claim 10, wherein the step (b) of selecting media processing resources comprises selecting responsive to bandwidth usage defined for each branch in a Call Admission Control (CAC) policy.

13. A method of managing communications in a telecommunications network as in claim 10, wherein conference media processing resources are selected for each conference call responsive to bandwidth consumed by each media stream.

14. A non-transitory computer program product for managing communications in a telecommunications network, said computer program product comprising a computer usable medium having computer readable program code stored thereon, said computer readable program code comprising:
 computer readable program code means for monitoring a plurality of branches of a telecommunications network for requests for conference calls amongst endpoints at said plurality of branches; and
 computer readable program code means for selecting conference media processor resources in branches involved in the requested conference call, selected resources being selected from available system resources based on user location, branch bandwidth usage, and availability of media resources and media processor ports, wherein said resources are selected to optimize bandwidth usage in said telecommunications network.

15. A computer program product as in claim 14, further comprising:
 computer readable program code means for determining when remaining resources are insufficient in one involved branch, and
 computer readable program code means for routing a respective media stream through an external network between said one and other said branches in the requested conference call.

16. A computer program product as in claim 14, wherein the computer readable program code means for selecting media processing resources comprises computer readable program code means for selecting responsive to bandwidth usage defined for each branch in a Call Admission Control (CAC) policy.

17. A computer program product as in claim 14, wherein computer readable program code means for selecting media processing resources selects resources for each conference call responsive to bandwidth consumed by each media stream.

* * * * *